United States Patent
Wynn, Jr.

(10) Patent No.: US 7,040,344 B2
(45) Date of Patent: May 9, 2006

(54) PRESSURE REGULATOR INCLUDING A FIXED VALVE BALL AND METHOD OF ASSEMBLING THE SAME

(75) Inventor: James Archie Wynn, Jr., Virginia Beach, VA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 239 days.

(21) Appl. No.: 10/455,631

(22) Filed: Jun. 6, 2003

(65) Prior Publication Data

US 2004/0244839 A1    Dec. 9, 2004

(51) Int. Cl.
G05D 16/08 (2006.01)
F16K 31/365 (2006.01)
G05D 16/02 (2006.01)

(52) U.S. Cl. ...................... 137/510; 123/459
(58) Field of Classification Search ................ 137/509, 137/510; 123/459, 463, 465
See application file for complete search history.

(56) References Cited

U.S. PATENT DOCUMENTS

| | | | |
|---|---|---|---|
| 2,603,231 A | 7/1952 | Birkemeier | |
| 2,618,290 A | 11/1952 | Van Vliet | |
| 3,511,270 A * | 5/1970 | Fehrenbach et al. | 137/510 |
| 4,660,597 A | 4/1987 | Cowles | |
| 4,825,835 A * | 5/1989 | Deweerdt | 123/463 |
| 5,265,644 A | 11/1993 | Tuckey | |
| 5,279,327 A * | 1/1994 | Alsobrooks et al. | 137/510 |
| 5,394,900 A * | 3/1995 | Okuyama et al. | 137/510 |
| 5,435,345 A * | 7/1995 | Robinson et al. | 137/508 |
| 5,901,742 A | 5/1999 | Kleppner et al. | |
| 5,979,409 A | 11/1999 | Robinson | |
| 6,016,831 A | 1/2000 | Bueser et al. | |
| 6,029,694 A * | 2/2000 | Schwegler et al. | 137/510 |
| 6,039,030 A | 3/2000 | Robinson et al. | |

FOREIGN PATENT DOCUMENTS

| | | |
|---|---|---|
| DE | 19508637 | 9/1996 |
| EP | 1106819 | 6/2001 |

* cited by examiner

Primary Examiner—Stephen M. Hepperle

(57) ABSTRACT

A pressure regulator includes a housing, a divider, and a valve. The housing includes an inlet and an outlet. The divider separates the housing into a first chamber and a second chamber. And the valve includes a spherical valve ball and a seat. The spherical valve ball is fixed with respect to a first one of the housing and the divider, and the seat is fixed with respect to a second one of the housing and the divider. A first configuration of the spherical valve ball with respect to the seat substantially prevents fluid communication between the inlet and the outlet, and a second configuration of the spherical valve ball with respect to the seat permits fluid communication between the inlet and the outlet.

13 Claims, 2 Drawing Sheets

PRESSURE REGULATOR INCLUDING A FIXED VALVE BALL AND METHOD OF ASSEMBLING THE SAME

FIELD OF THE INVENTION

This invention relates to a pressure regulator for automotive fuel systems, and more particularly to by-pass valve or flow-through type pressure regulators having a fixed spherical valve ball.

BACKGROUND OF THE INVENTION

Most modern automotive fuel systems utilize fuel injectors to deliver fuel to the engine cylinders for combustion. The fuel injectors are mounted on a fuel rail to which fuel is supplied by a pump. The pressure at which the fuel is supplied to the fuel rail must be metered to ensure the proper operation of the fuel injectors. Metering is carried out using pressure regulators that control the pressure of the fuel in the system at all engine r.p.m. levels.

It is believed that tolerances in pressure regulator components, and tolerances in pressure regulator assembly equipment, along with the inherent unbalanced forces applied by a compression spring to a diaphragm assembly, can cause misalignment between a valve ball and a valve seat. A known fuel pressure regulator uses a so-called "floating" valve ball that is movable within a valve assembly. By virtue of the valve ball floating, the valve ball can align itself with the valve seat, thus compensating for misalignment. In the known fuel pressure regulator, the floating valve ball assembly is made of a ball pocket, a valve ball movable within the ball pocket, a ball spring that applies a biasing force urging the valve ball along a longitudinal axis (thus opposing unrestrained movement of the valve ball along the longitudinal axis), and a floating retainer washer. The valve ball, ball spring and retaining washer are retained in the valve pocket assembly by either an additional feature coupled to the valve pocket or by rolling over a flange portion of the ball pocket.

The known fuel pressure regulator suffers from a number of disadvantages, including a valve ball assembly that includes a plurality of parts that must be sub-assembled before the valve ball assembly can be installed in the known fuel pressure regulator. Thus, there is believed to be a need to provide a pressure regulator that does not suffer from these disadvantages.

SUMMARY OF THE INVENTION

The present invention provides a pressure regulator that includes a housing, a divider, and a valve. The housing includes an inlet and an outlet. The divider separates the housing into a first chamber and a second chamber. And the valve includes a spherical valve ball and a seat. The spherical valve ball is fixed with respect to a first one of the housing and the divider, and the seat is fixed with respect to a second one of the housing and the divider. A first configuration of the spherical valve ball with respect to the seat substantially prevents fluid communication between the inlet and the outlet, and a second configuration of the spherical valve ball with respect to the seat permits fluid communication between the inlet and the outlet.

The present invention also provides a method of assembling a pressure regulator. The method includes positioning within a housing a spherical valve ball, a seat, a divider and a resilient element, enclosing the housing, and welding in place the spherical valve ball so as to be aligned with the seat. The divider separates the housing into first and second chambers, and the resilient element biases the divider such that the spherical valve ball sealingly engages the seat. And the enclosing includes securing together first and second housing parts.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT

Figure 1:
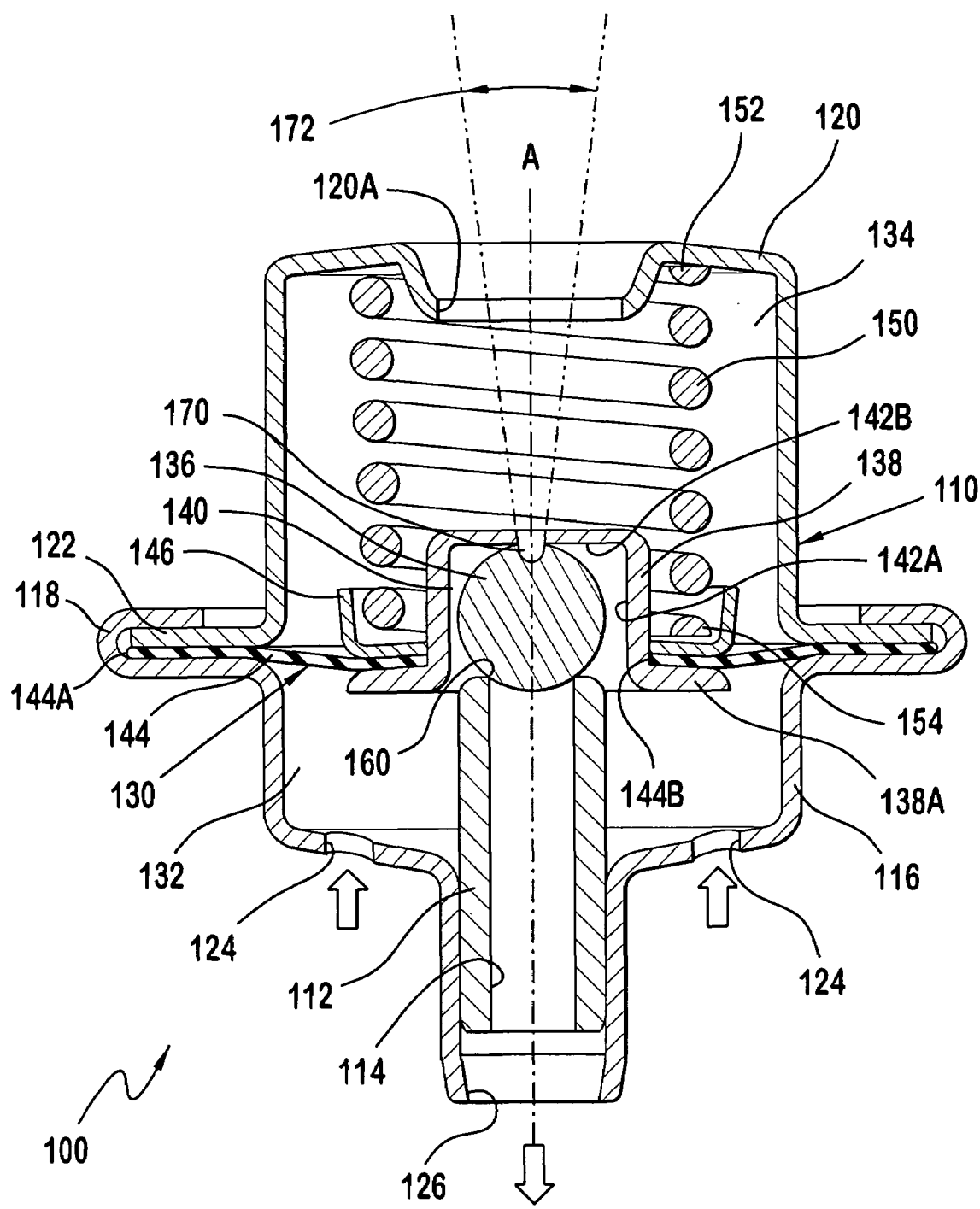
FIG. 1 illustrates a by-pass valve pressure regulator according to the present invention.

FIG. 1 illustrates a by-pass valve type of pressure regulator 100 according to the present invention. The pressure regulator 100 includes a housing 110. The housing 110 is separated by a divider 130 into a first chamber 132 and a second chamber 134. The divider 130 includes a spherical valve ball 136 that cooperates with a seat 112, which is fixed to the housing 110, and defines a passage 114. In a first configuration, the spherical valve ball 136 sealingly engages the seat 112 so as to prevent fluid communication between the first chamber 132 and the passage 114. And in a second configuration, the spherical valve ball 136 is spaced from the seat 112 so as to permit fluid communication between the first chamber 132 and the passage 114.

The housing 110 includes a first housing part 116 with a first flange 118, and includes a second housing part 120 with a second flange 122. The first housing part 118 also includes at least one fluid inlet 124 (two are shown) and a fluid outlet 126. Preferably, a plurality of the fluid inlets 124 are disposed in a pattern around the fluid outlet 126, and the fluid outlet is in direct fluid communication with the passage 114 of the seat 112.

The divider 130 includes a cup 138 having a cup flange 138A and a set of surfaces that define a ball pocket 140. In particular, the cup 138 includes a cylindrical surface 142A that is generally concentric about a longitudinal axis A, and includes an end surface 142B to which the spherical valve ball 136 is fixed.

The divider 130 also includes a diaphragm 144 and a retainer 146. Preferably, the diaphragm 144 includes a flexible, fluid impermeable annulus having an outside perimeter 144A and an inside perimeter 144B. The outside perimeter 144A is secured to the housing 110 by virtue of being sandwiched between the first flange 118 of the first housing part 116 and the second flange 122 of the second housing part 120. The inside perimeter 144B is secured to the cup 138 by virtue of being sandwiched between the cup flange 138A and the retainer 146. Preferably, the retainer 146 is coupled to the cup 138 by means of press-fitting, or some other secure connection.

A resilient element 150, which is preferably a compression coil spring, is located in the second chamber 134 and biases the divider 130 toward the first configuration of the spherical valve ball 136 and the seat 112. Preferably, the resilient element 150 has a first end 152 that contiguously engages the second housing part 120, and has a second end 154 that contiguously engages the retainer 146. The resilient element 150 biases the divider 130 at a predetermined force, which relates to the pressure desired for the regulator 100.

A method of assembling the pressure regulator 100 will now be described. In preparation for the final assembly, the seat 112 is fixed, e.g., by staking, with respect to the first housing part 116, and the inner perimeter 144B of the diaphragm 144 is placed around the cup 138 and the retainer 146 is press-fitted onto the cup 138. The spherical valve ball 136 is positioned with respect to the seat 112 so as to engage one another at an interface 160. The divider 130 is positioned on the first housing part 116 such that the ball pocket 140 defined by the cup 138 receives the spherical valve ball 136 and, generally concurrently, the outer perimeter 144A of the diaphragm 144 is set onto the first flange 118 of the first housing part 116. The second end 154 of the resilient element 150 is seated against the retainer 146 with the cup 138 extending inside the resilient element 150. The second housing part 120 is lowered such that the second chamber 134 receives the resilient element 150, and the first end 152 of the resilient element 150 is seated against the second housing part 120. The second housing part 120 is pressed, against the bias of the resilient element 150, toward the first housing part 116 until the second flange 122 abuts the outer perimeter 144A of the diaphragm 144. The first flange 118 is then rolled and crimped so as to contiguously engage the second flange 122 of the second housing part 120, thus enclosing the housing 110 with all the components contained therein.

Inasmuch as the resilient element 150 typically applies an unbalanced force on the divider 130, the cup 138 defining the pocket 140 may be forced off-center with respect to the spherical valve ball 136.

Finally, after the housing 110 is enclosed and the valve ball 136 is aligned with the seat 112 at the interface 160, the valve ball 136 and the cup 138 are fixed together, preferably by a weld 170. In particular, a welding beam 172 is directed through an opening 120A in the second housing part 120, toward the point of contact between the spherical valve ball 136 and the end surface 142B of the cup 138, thereby welding together the spherical valve ball 136 and the cup 138.

The operation of the by-pass valve type pressure regulator 100 will now be described. The resilient element 150 acts through the retainer 146 to bias the divider 130 toward the first configuration of the spherical valve ball 136 and the seat 112. Thus, the spherical valve ball 136 sealingly engages the seat 112 at the interface 160 and no fluid can pass through the pressure regulator 100, i.e., from the at least one fluid inlet 124 to the fluid outlet 126.

Fluid enters the pressure regulator 100 through the at least one fluid inlet 124 and exerts pressure on the divider 130. When the pressure of the fluid is greater than the force exerted by the resilient element 150, the flexibility of the diaphragm 144 allows the cup 138 to move along the longitudinal axis toward the second housing part 120, thus the spherical valve ball 136 separates at the interface 160 from the seat 112, i.e., achieving the second configuration of the spherical valve ball 136 and the seat 112. Fluid can then flow through the pressure regulator 100. Specifically, fluid that has entered the first chamber 132, e.g., through the at least one fluid inlet 124, passes between the separated spherical valve ball 136 and the seat 112 into the passage 114, and exits from the passage 114 through the fluid outlet 126.

As the incoming fluid pressure is reduced, the force of the resilient element 150 overcomes the fluid pressure and returns the spherical valve ball 136 to engagement with the seat 112, i.e., the first configuration of the spherical valve ball 136 and the seat 112.

Figure 2:
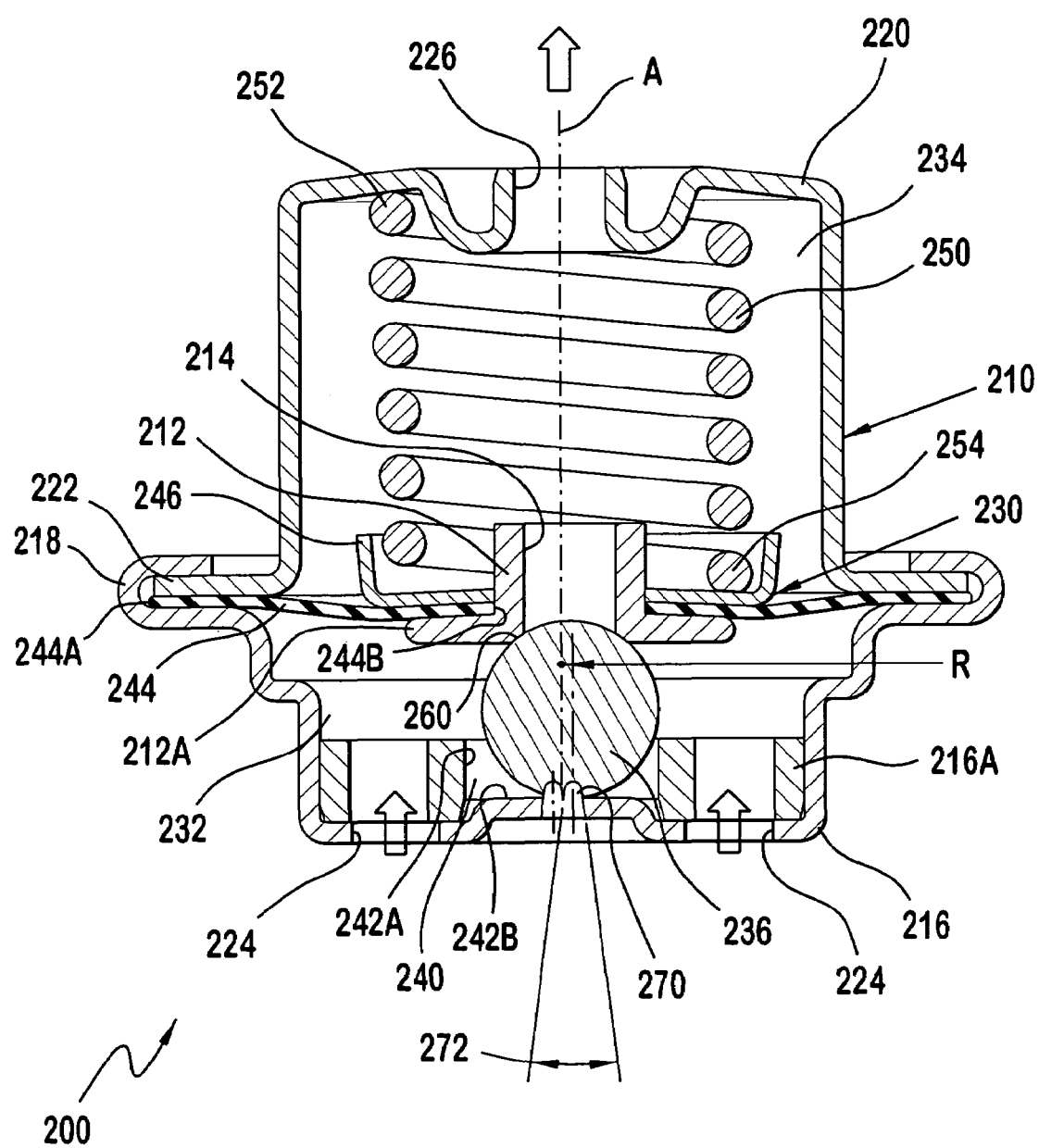
FIG. 2 illustrates a flow-through pressure regulator according to the present invention.

Referring now to FIG. 2, there is shown a flow-through type of pressure regulator 200 according to the present invention. The pressure regulator 200 includes a housing 210. The housing 210 is separated by a divider 230 into a first chamber 232 and a second chamber 234. The divider 230 includes a seat 212 having a seat flange 212A and a passage 214, and that cooperates with a spherical valve ball 236, which is fixed to the housing 210. In a first configuration, the spherical valve ball 236 sealingly engages the seat 212 so as to prevent fluid communication between the first and second chambers 232,234. And in a second configuration, the spherical valve ball 236 is spaced from the seat 212 so as to permit fluid communication between the first and second chambers 232,234.

The housing 210 includes a first housing part 216 with a first flange 218, and includes a second housing part 220 with a second flange 222. The first housing part 218 also includes at least one fuel inlet 224 (two are shown), and the second housing part 220 also includes a fuel outlet 226. Preferably, there are a plurality of the fuel inlets 224, and the fuel outlet is in fluid communication, via the second chamber 234, with the passage 214 of the seat 212.

The first housing part 216 includes a set of surfaces that define a ball pocket 240. In particular, the first housing part 216 includes a cylindrical surface 242A that is generally concentric about a longitudinal axis A, and includes an end surface 242B to which the spherical valve ball 236 is fixed. Preferably, the cylindrical surface 242A is established by a nest 216A positioned with respect to the first housing part 216. The nest 216A may be molded so as to include a filter (not shown) through which fuel entering the first chamber 232 may pass.

The divider 230 also includes a diaphragm 244 and a retainer 246. Preferably, the diaphragm 244 includes a flexible, fluid impermeable annulus having an outside perimeter 244A and an inside perimeter 244B. The outside perimeter 244A is secured to the housing 210 by virtue of being sandwiched between the first flange 218 of the first housing part 216 and the second flange 222 of the second housing part 220. The inside perimeter 244B is secured to the seat 212 by virtue of being sandwiched between the seat flange 212A and the retainer 246. Preferably, the retainer 246 is coupled to the seat 212 by means of press-fitting, or some other secure connection.

A resilient element 250, which is preferably a compression coil spring, is located in the second chamber 234 and biases the divider 230 toward the first configuration of the spherical valve ball 236 and the seat 212. Preferably, the resilient element 250 has a first end 252 that contiguously engages the second housing part 220, and has a second end 254 that contiguously engages the retainer 246. The resilient element 250 biases the divider 230 at a predetermined force, which relates to the pressure desired for the pressure regulator 200.

A method of assembling the pressure regulator 200 will now be described. In preparation for the final assembly, the nest 216A is positioned with respect to the first housing part 216, and the inner perimeter 244B of the diaphragm 244 is placed around the seat 212 and the retainer 246 is press-fitted onto the seat 212. The spherical valve ball 236 is loosely positioned on the end surface 242B. The divider 230 is positioned on the first housing part 216 such that the spherical valve ball 236 is positioned with respect to the seat 212 so as to engage one another at an interface 260 and, generally concurrently, the outer perimeter 244A of the diaphragm 244 is set onto the first flange 218 of the first housing part 216. The second end 254 of the resilient element 250 is seated against the retainer 246 with the seat 212 and its passage 214 extending inside the resilient element 250. The second housing part 220 is lowered such that the second chamber 234 receives the resilient element 250, and the first end 252 of the resilient element 250 is seated against the second housing part 220. The second housing part 220 is pressed, against the bias of the resilient element 250, toward the first housing part 216 until the second flange 222 abuts the outer perimeter 244A of the diaphragm 244. The first flange 218 is then rolled and crimped so as to contiguously engage the second flange 222 of the second housing part 220, thus enclosing the housing 210 with all the components contained therein.

Inasmuch as the resilient element 250 typically applies an unbalanced force on the divider 230, the spherical valve ball 236 may be forced off-center, relative to the longitudinal axis A, in the pocket 240.

Finally, after the housing 210 is enclosed and the valve ball 236 is aligned with the seat 212 at the interface 260, the valve ball 236 and the first housing part 216 are fixed together, preferably by a weld 270. In particular, a welding beam 272 is directed at the first housing part 216, toward the possible points of contact between the spherical valve ball 236 and the end surface 242 of the first housing part 216. Inasmuch as the spherical valve ball 236 may not be centered in the pocket 240, the welding beam 272 may be moved along a circular path, having a radius R, surrounding the longitudinal axis A, thereby forming the weld 270 so as to cover the entire area in which the spherical valve ball 26 could contact the first housing part 216.

The operation of the by-pass valve type pressure regulator 200 for a vehicle fuel system will now be described. The resilient element 250 acts through the retainer 246 to bias the divider 230 toward the first configuration of the spherical valve ball 236 and the seat 212. Thus, the spherical valve ball 236 sealingly engages the seat 212 at the interface 260 and no fuel can pass through the pressure regulator 200, i.e., from the at least one fuel inlet 224 to the fuel outlet 226.

Fuel enters the pressure regulator 200 through the at least one fuel inlet 224 and exerts pressure on the divider 230. When the pressure of the fuel is greater than the force exerted by the resilient element 250, the flexibility of the diaphragm 244 allows the seat 212 to move along the longitudinal axis A toward the second housing part 220, thus the spherical valve ball 236 separates at the interface 260 from the seat 212, i.e., achieving the second configuration of the spherical valve ball 236 and the seat 212. Fuel can then flow through the pressure regulator 200. Specifically, fuel that has entered the first chamber 232, e.g., through the at least one fuel inlet 224, passes between the separated spherical valve ball 236 and the seat 212, passes through the passage 214 and into the second chamber 234, and exits from the second chamber 234 through the fuel outlet 226.

As the incoming fuel pressure is reduced, the force of the resilient element 250 overcomes the fuel pressure and returns the seat 212 to engagement with the spherical valve ball 236, i.e., the first configuration of the spherical valve ball 236 and the seat 212.

The pressure regulators 100,200 according to the present invention provide a number of advantages, including eliminating a ball spring, ball retaining washer and a part or process to retain the valve ball in the ball pocket while still ensuring alignment between the valve ball and the valve seat. Significantly, the present invention results in manufacturing advantages due to the elimination of parts, simplification of the assembly process, and the associated cost reductions.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A pressure regulator comprising:
   a housing including an inlet and an outlet;
   a divider separating the housing into a first chamber and a second chamber;
   a valve including a spherical valve ball and a seat, the spherical valve ball being fixed with respect to a first one of the housing and the divider, and the seat being fixed with respect to a second one of the housing and the divider, a first configuration of the spherical valve ball with respect to the seat substantially prevents fluid communication between the inlet and the outlet, and a second configuration of the spherical valve ball with respect to the seat permits fluid communication between the inlet and the outlet;
   a pocket receiving a portion of the spherical valve ball, the pocket being defined by a set of surfaces, the set of surfaces including a cylindrical surface coupled to an end surface, the cylindrical surface surrounding a longitudinal axis, and the end surface extending generally orthogonal relative to the longitudinal axis, wherein the spherical valve ball is fixed to the end surface.

2. The pressure regulator of claim 1, further comprising:
   a resilient element extending between the housing and the divider, the resilient element biasing the spherical valve ball and the seat toward one another.

3. The pressure regulator of claim 1, further comprising:
   a seal surface at an interface of the spherical valve ball and the seat in the first configuration.

4. The pressure regulator of claim 1, wherein the seal surface comprises a circle.

5. The pressure regulator of claim 1, wherein the spherical valve ball is welded to the end surface.

6. The pressure regulator of claim 1, wherein the divider comprises a cup defining the set of surfaces, and the seat being fixed to the housing.

7. The pressure regulator of claim 6, wherein the divider comprises a diaphragm and a retainer, the diaphragm extending between the housing and the cup, and the retainer engaging the cup so as to sandwich the diaphragm between the cup and the retainer.

8. The pressure regulator of claim 7, wherein the housing comprises first and second housing parts, the first housing part defining the first chamber and the second housing part defining the second chamber, and the first housing part comprises the inlet and the outlet.

9. The pressure regulator of claim 8, wherein the seat defines a passage, the passage permitting in the second configuration fluid communication between the first chamber and the outlet.

10. The pressure regulator of claim 1, wherein the divider comprises the seat, and the spherical valve ball being fixed to the housing.

11. The pressure regulator of claim 10, wherein the divider comprises a diaphragm and a retainer, the diaphragm extending between the housing and the seat, and the retainer engaging the seat so as to sandwich the diaphragm between the seat and the retainer.

12. The pressure regulator of claim 11, wherein the housing comprises first and second housing parts, the first housing part defining the first chamber and including the inlet, and the second housing part defining the second chamber and including the outlet.

13. The pressure regulator of claim 12, wherein the seat defines a passage, the passage permitting in the second configuration fluid communication between the first and second chambers.

* * * * *